Sept. 7, 1926.
E. ANDERSON ET AL
1,599,001
TRACTION DEVICE FOR VEHICLE WHEELS
Filed June 24, 1925
2 Sheets-Sheet 1
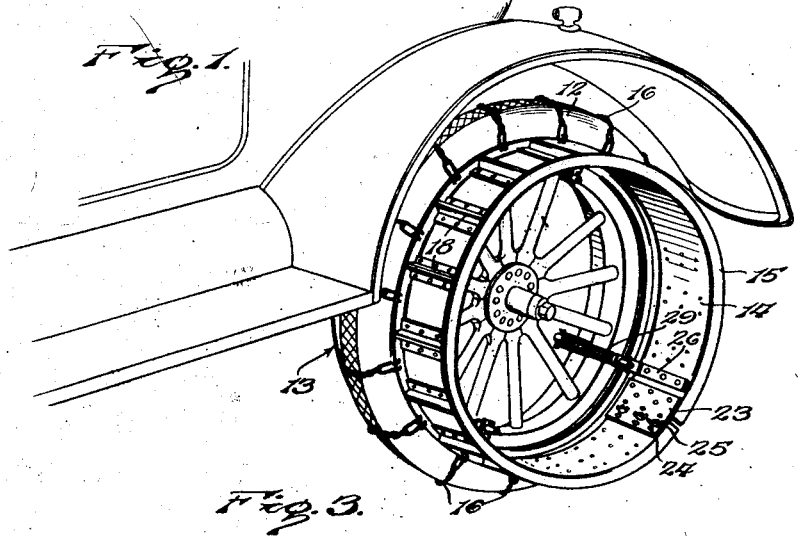
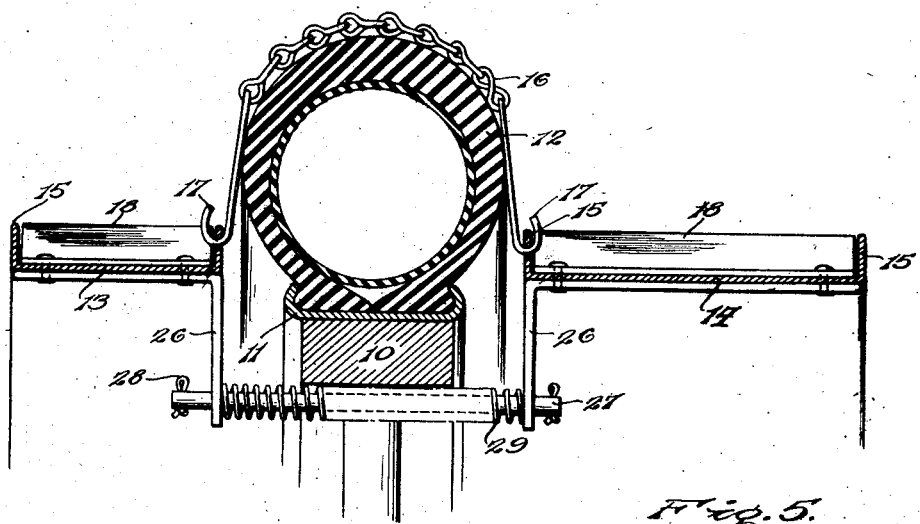
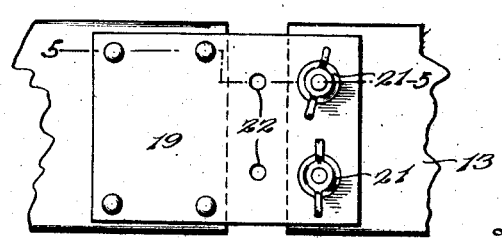
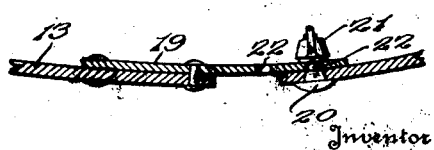
Inventor
E. Anderson &
J. Anderson
By
Lacey&Lacey, Attorneys Sept. 7, 1926.  
E. ANDERSON ET AL  
1,599,001  
TRACTION DEVICE FOR VEHICLE WHEELS  
Filed June 24, 1925   2 Sheets-Sheet 2

Inventors  
E. Anderson &  
J. Anderson  
By Lacey & Lacey, Attorneys

Patented Sept. 7, 1926.

1,599,001

UNITED STATES PATENT OFFICE.

EDWARD ANDERSON AND JOHN ANDERSON, OF FLORENCE, WISCONSIN.

TRACTION DEVICE FOR VEHICLE WHEELS.

Application filed June 24, 1925. Serial No. 39,311.

This invention relates to an improved traction device for motor vehicles and seeks, among other objects, to provide a device which will enable an automobile to travel in snow.

The invention seeks, as a further object, to provide a pair of auxiliary traction rims which may be applied to each rear wheel of the vehicle and wherein the rims will be connected by cross chains extending across the vehicle tires for supporting the traction rims upon the wheels as well as providing additional traction for the wheels.

The invention seeks, as a still further object, to provide a device wherein any looseness or wear in the cross chains will be automatically taken up so that the cross chains will, at all times, be held taut across the wheel tires.

And the invention seeks, as a still further object, to provide a device which may be readily applied and as easily removed.

Other and incidental objects will appear hereinafter.

In the accompanying drawings:

Figure 1 is a fragmentary perspective view showing our improved traction device applied to one rear wheel of a conventional motor vehicle.

Figure 3 is an enlarged transverse sectional view particularly showing the tensioning means for the traction chains.

Figure 4 is a fragmentary plan view showing the connection between the sections of the traction rims.

Figure 5 is a sectional view on the line 5—5 of Figure 4.

Figure 2:
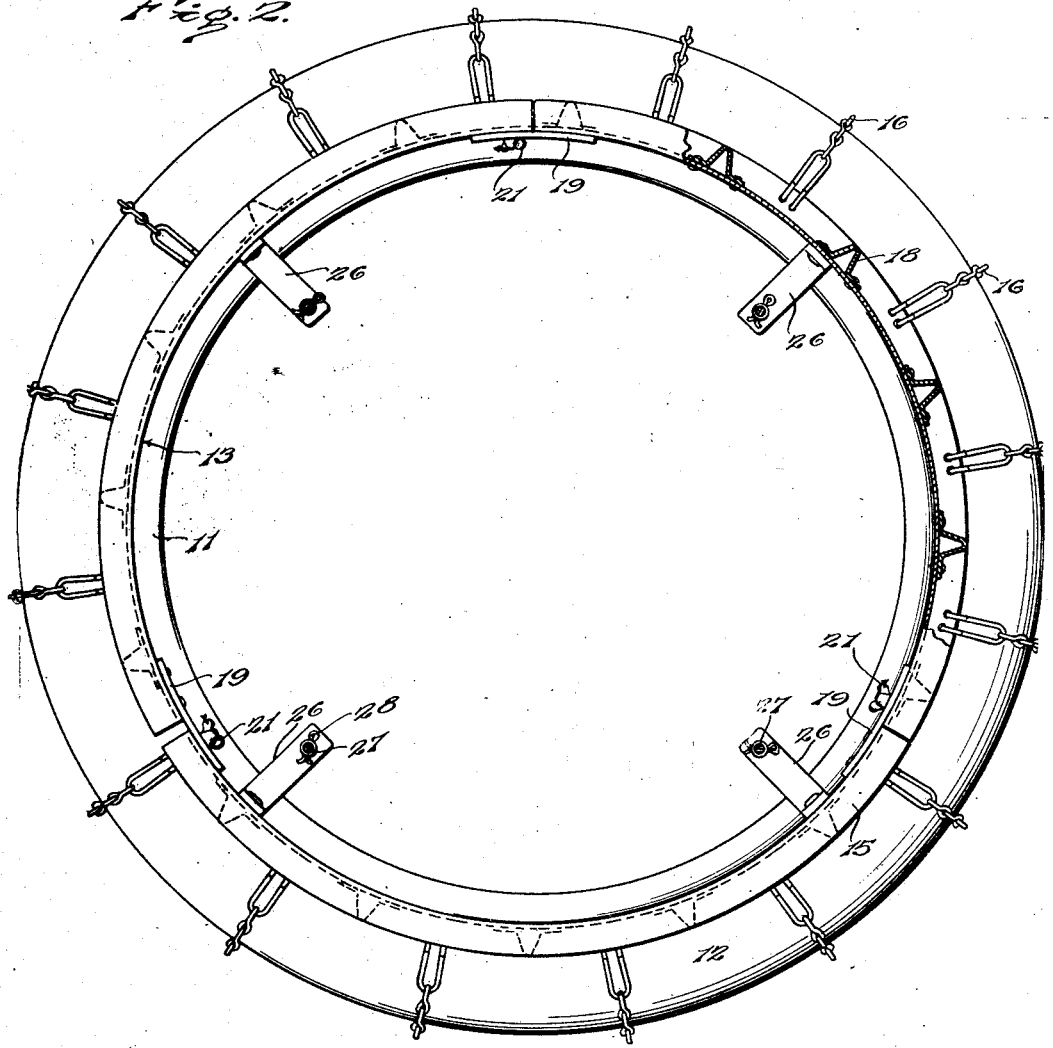
Figure 2 is a side elevation looking at the inner traction rim.

For convenience we have, in the drawings, shown our improved traction device in connection with one rear wheel of a conventional motor vehicle. The wheel felly is indicated at 10, the rim at 11, and the tire at 12. In accordance with the present invention, we employ inner and outer auxiliary traction rims 13 and 14 respectively. These rims are preferably formed of sheet metal and, as shown in Figure 3, are substantially channel shaped in cross section, being provided with annular side flanges 15. The inner rim 13 is disposed at the inner side of the wheel next to the vehicle body while the outer rim 14 is disposed at the outer side of the wheel and, as will be observed, the outer rim is preferably somewhat wider than the inner rim. Connecting the rims with each other is a series of traction chains 16 which extend across the wheel tire 12 and are provided at their ends with hooks 17 engaged through suitable openings in those of the flanges 15 of the rims which lie next to the wheel. Any suitable number of cross chains may be employed and, as will be perceived, these chains will support the rims 13 and 14 in centered relation with respect to the wheel. Fixed to the rims at suitably spaced points are transversely disposed cleats 18 extending between the flanges 15 of the rims. These cleats are preferably formed of sheet metal plates bent up medially to provide ribs which lie flush with the edges of the flanges while the ends of said plates are riveted or otherwise secured to the rims.

In order that the device may be readily applied, the inner rim 13 is, as shown in Figure 2, preferably formed of three companion sections, and fixed to corresponding ends of said sections at the inner sides thereof are end plates 19, one of which is shown in detail in Figure 4. Extending through opposite corresponding ends of the sections and through the free ends of the plates, as shown in Figure 5, are bolts 20, and these bolts are preferably equipped with wing nuts 21. Thus, the sections of the rim are rigidly connected with each other and, preferably, the plates 19 are provided with spaced pairs of openings 22 to selectively accommodate the bolts 20 so that the circumference of the rim may be varied to suit different wheels. The outer rim is, as shown in Figure 1, split at a single point only and fixed to one end of the rim at its inner side is a plate 23 provided with spaced openings 24 to receive bolts 25 like the bolts 20. Thus, the outer rim is rigidly connected at its ends and, like the inner rim, may be expanded to suit different wheels.

Riveted or otherwise secured to the rims 13 and 14 at the inner sides thereof is a plurality of equi-distantly spaced angle brackets 26 corresponding arms of which extend transversely of the rims throughout the full width thereof for bracing and reinforcing said rims. The opposite corresponding arms of the brackets project radially inward flush with the inner edges of the rims, and extending freely through said arms at the inner circumference of the felly 10 of the wheel are cross rods 27 secured against endwise displacement by cotter keys 28. Surrounding said rods to coact between the brackets 26 are springs 29 tending to press the rims 13 and 14 apart. Thus, these springs will, as will be perceived, serve to tension the traction chains 16 and automatically take up any looseness or wear occurring in said chains. Furthermore, as will be observed, the rods 27 lie close to the inner circumference of the wheel felly 10 and will thus coact with the felly for limiting the rims 13 and 14 against eccentric movement with respect to the wheel.

Figure 6:
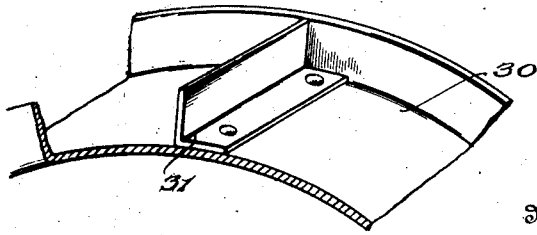
Figure 6 is a fragmentary perspective view showing a slightly modified form of traction cleat.

In Figure 6 of the drawings, we have illustrated a slight modification of the invention wherein the traction rims, as typically illustrated at 30, are provided with angle cleats 31 in lieu of the cleats 18. In some instances, the cleats 31 may be found more efficient.

Having thus described the invention, what we claim is:

1. A traction device for vehicle wheels including inner and outer traction rims to lie at opposite sides of the wheel, means flexibly connecting said rims, and yieldable means tending to press the rims apart and maintain said first mentioned means under tension.

2. A traction device for vehicle wheels including inner and outer traction rims to lie at opposite sides of the wheel, traction chains flexibly connecting the rims and disposed to extend across the outer circumference of the wheel, and springs tending to press the rims apart and maintain said chains under tension.

3. A traction device for vehicle wheels including inner and outer traction rims to lie at opposite sides of the wheel, means flexibly connecting said rims, brackets carried by the rims, cross rods extending between said brackets and freely engaged therewith, and springs carried by said rods to coact with the brackets for pressing the rims apart and maintaining said means under tension.

4. A traction device for vehicle wheels including inner and outer traction rims to lie at opposite sides of the wheel, traction chains flexibly connecting the rims and disposed to extend across the outer circumference of the wheel, brackets carried by the rims, cross rods slidably received through said brackets, and springs surrounding the rods to coact between the brackets for pressing the rims apart and maintaining said chains under tension.

In testimony whereof we affix our signatures.

EDWARD ANDERSON. [L. S.]
JOHN ANDERSON. [L. S.]